US012620906B2

(12) United States Patent
Wu et al.

(10) Patent No.: US 12,620,906 B2
(45) Date of Patent: May 5, 2026

(54) SYNCHRONOUS RECTIFICATION CONTROLLER AND CONTROL METHOD THEREOF

(71) Applicant: Leadtrend Technology Corporation, Zhubei City (TW)

(72) Inventors: Tsung-Chien Wu, Zhubei City (TW); Jun-Hao Huang, Zhubei City (TW); Chung-Wei Lin, Zhubei City (TW); Ming-Chang Tsou, Zhubei City (TW)

(73) Assignee: LEADTREND TECHNOLOGY CORPORATION, Zhubei City (TW)

( * ) Notice: Subject to any disclaimer, the term of this patent is extended or adjusted under 35 U.S.C. 154(b) by 204 days.

(21) Appl. No.: 18/636,740

(22) Filed: Apr. 16, 2024

(65) Prior Publication Data

US 2025/0030351 A1 Jan. 23, 2025

(30) Foreign Application Priority Data

Jul. 19, 2023 (TW) ................................. 112126895

(51) Int. Cl.
*H02M 3/335* (2006.01)

(52) U.S. Cl.
CPC ............................... *H02M 3/33592* (2013.01)

(58) Field of Classification Search
CPC ................................................ H02M 3/33592
See application file for complete search history.

(56) References Cited

U.S. PATENT DOCUMENTS

| | | | | |
|---|---|---|---|---|
| 10,063,131 B2 * | 8/2018 | Yang | ................. | H02M 3/33507 |
| 10,404,180 B2 * | 9/2019 | Greenwood | ...... | H02M 3/33507 |
| 10,560,012 B1 * | 2/2020 | Yang | ................. | H02M 3/33523 |
| 2012/0300520 A1 * | 11/2012 | Ren | .................... | H02M 3/33592 |
| | | | | 363/127 |
| 2014/0334205 A1 * | 11/2014 | Zhang | .................. | H05B 45/382 |
| | | | | 363/89 |
| 2018/0331615 A1 * | 11/2018 | Yang | ...................... | H02M 3/285 |
| 2019/0393794 A1 * | 12/2019 | Feng | ........................ | H03K 17/18 |
| 2022/0302850 A1 * | 9/2022 | Wu | ..................... | H02M 1/0032 |
| 2023/0015445 A1 * | 1/2023 | Wu | ..................... | H02M 1/0006 |
| 2023/0216420 A1 * | 7/2023 | Miao | ................. | H02M 3/33592 |
| | | | | 363/21.14 |
| 2024/0039417 A1 * | 2/2024 | Chen | ................. | H02M 3/33523 |

* cited by examiner

*Primary Examiner* — Sisay G Tiku

(74) *Attorney, Agent, or Firm* — McClure, Qualey & Rodack, LLP

(57) ABSTRACT

A control method is disclosed to generate a control signal in a power supply with a synchronous rectifier. The control signal turns ON the synchronous rectifier to provide a channel approximately short-circuited if the control signal is greater than a threshold voltage, and turns OFF the synchronous rectifier to turn the channel into an open circuit if the control signal is between the threshold voltage and a ground reference voltage. A detection signal is generated based on one end of the channel, and compared with a predetermined level higher than the ground reference voltage. An excitation time is a period when the detection signal exceeds the predetermined level. When the excitation time exceeds a preset time, the control signal is precharged to a sub-threshold voltage between the threshold voltage and the ground reference voltage.

20 Claims, 5 Drawing Sheets

800

802

$T_{PL} > T_{QR}$ ?

NO

YES

804 precharge $S_{SEC}$ up to $V_{SUB\_T}$

806

$V_{DET} < V_{SR\_ON}$ ?

NO

YES

808 enable driver MI to turn ON SWSR

810

After a period, disable driver MI and enable driver MII

812 turn OFF SWSR when $V_{DET} > 0$, or time constraint is met.

814

$V_{DET} < V_{SR\_ON}$ ?

NO

YES

816 precharge $S_{SEC}$ up to $V_{SUB\_T}$

818 enable driver MII to control SWSR

820 turn OFF SWSR when $V_{DET} > 0$

SYNCHRONOUS RECTIFICATION CONTROLLER AND CONTROL METHOD THEREOF

CROSS-REFERENCE TO RELATED APPLICATION

This application claims priority to and the benefit of Taiwan Application Series Number 112126895 filed on Jul. 19, 2023, which is incorporated by reference in its entirety.

BACKGROUND

The present disclosure relates generally to synchronous rectification, and more particularly to control methods and apparatuses that precharge a control signal at a control terminal of a synchronous rectifier.

Synchronous rectification is a technology that uses actively controlled electronic switches, such as power MOS-FETs or bipolar transistors, to replace diodes for rectification, in order to improve power supply efficiency. In conventional semiconductor diodes, the voltage drop is substantially at around 0.5 to 1V, and within the operating current range, this voltage drop does not vary significantly with the current. In contrast, the voltage drop across an actively controlled synchronous rectifier behaves more like a resistor, resulting in a tiny voltage drop at low currents.

The timing of switching ON and OFF a synchronous rectifier needs careful control. If the turning-on of a synchronous rectifier occurs too early, it may lead to the occurrence of reverse current, significantly reducing power supply efficiency. Conversely, if the turn-on happens too late, the majority of the current may flow through a body diode of the synchronous rectifier for example, losing the primary purpose of synchronous rectification.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
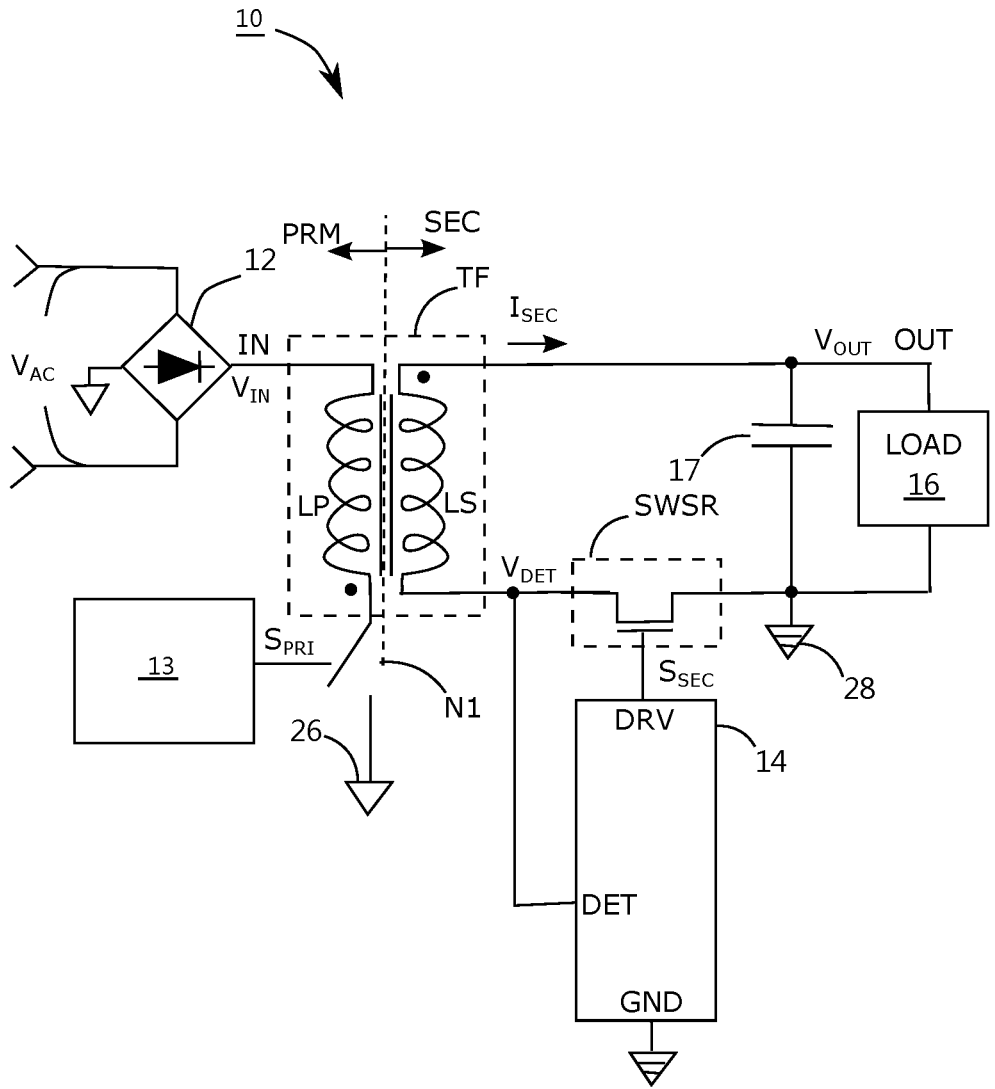
FIG. 1 illustrates a flyback power supply implemented according to embodiments of the present invention.

FIG. 1 illustrates flyback power supply 10 implemented according to embodiments of the present invention, serving as an isolated AC to DC power converter for converting AC power source VAC on primary side PRM into DC output power source VOUT on secondary side SEC. Flyback power supply 10 is just one embodiment of the present invention and is not intended to limit the invention. For example, embodiments of the present invention can also include LLC converters, active-clamp flyback power converters (ACF), or asymmetric half-bridge (AHB) power supplies.

In FIG. 1, transformer TF divides flyback power supply 10 into primary side PRM and secondary side SEC. On primary side PRM, bridge rectifier 12 rectifies AC power source VAC, providing input power source VIN on the input power line IN and input ground reference voltage on input ground line 26. Power controller 13 generates pulse-width modulation (PWM) signal $S_{PRI}$ to control power switch N1 and manage the energy storage and release of transformer TF.

As transformer TF stores and releases energy, the induced voltage across secondary winding LS and the induced current $I_{SEC}$ through secondary winding LS as well are generated. Synchronous rectifier SWSR is connected between output ground line 28 and secondary winding LS to rectify induced current $I_{SEC}$, generally maintaining induced current $I_{SE}C$ not less than OA. Induced current $I_{SEC}$ charges output capacitor 17, establishing DC output power source $V_{OUT}$ on output capacitor 17, supplying power to load 16.

SR controller 14 provides control signal $S_{SEC}$ through control terminal DRV to control synchronous rectifier SWSR. Synchronous rectifier SWSR can provide a channel, with one end connected to output ground line 28 and the other end connected to secondary winding LS. The joint between synchronous rectifier SWSR and secondary winding LS provides detection signal $V_{DET}$, which is fed back to SR controller 14 through detection terminal DET. Below, the voltage levels on the secondary side SEC are represented in relative voltage terms considering the voltage level at the output ground line 28 as 0V on secondary side SEC. For example, if detection signal $V_{DET}$ is stated as 15V, it means that detection signal $V_{DET}$ is 15V higher than the voltage at output ground line 28.

Synchronous rectifier SWSR in FIG. 1 is an enhancement-mode NMOS transistor characterized with threshold voltage $V_{SR\_TH}$. When control signal $S_{SEC}$ is greater than threshold voltage $V_{SR\_TH}$, synchronous rectifier SWSR provides a channel that is approximately short-circuited, connecting output ground line 28 to secondary winding LS. When control signal $S_{SEC}$ is between 0V and threshold voltage $V_{SR\_TH}$, that channel will approximately become open, isolating output ground line 28 from secondary winding LS.

In the embodiments of the present invention, based on detection signal $V_{DET}$, SR controller 14 can identify two possible conditions: 1) power switch N1 on primary side PRM has been turned ON for a sufficient duration, and 2) the forward-bias voltage across the channel of synchronous rectifier SWSR is sufficiently large. As long as one of these two conditions occurs, SR controller 14 precharges control terminal DRV to sub-threshold voltage $V_{SUB\_T}$, which is between the threshold voltage VSR_TH and 0V. In this way, synchronous rectifier SWSR can be quickly turned on based on the subsequent changes in detection signal $V_{DET}$, thereby increasing the efficiency of power conversion.

Figure 2:
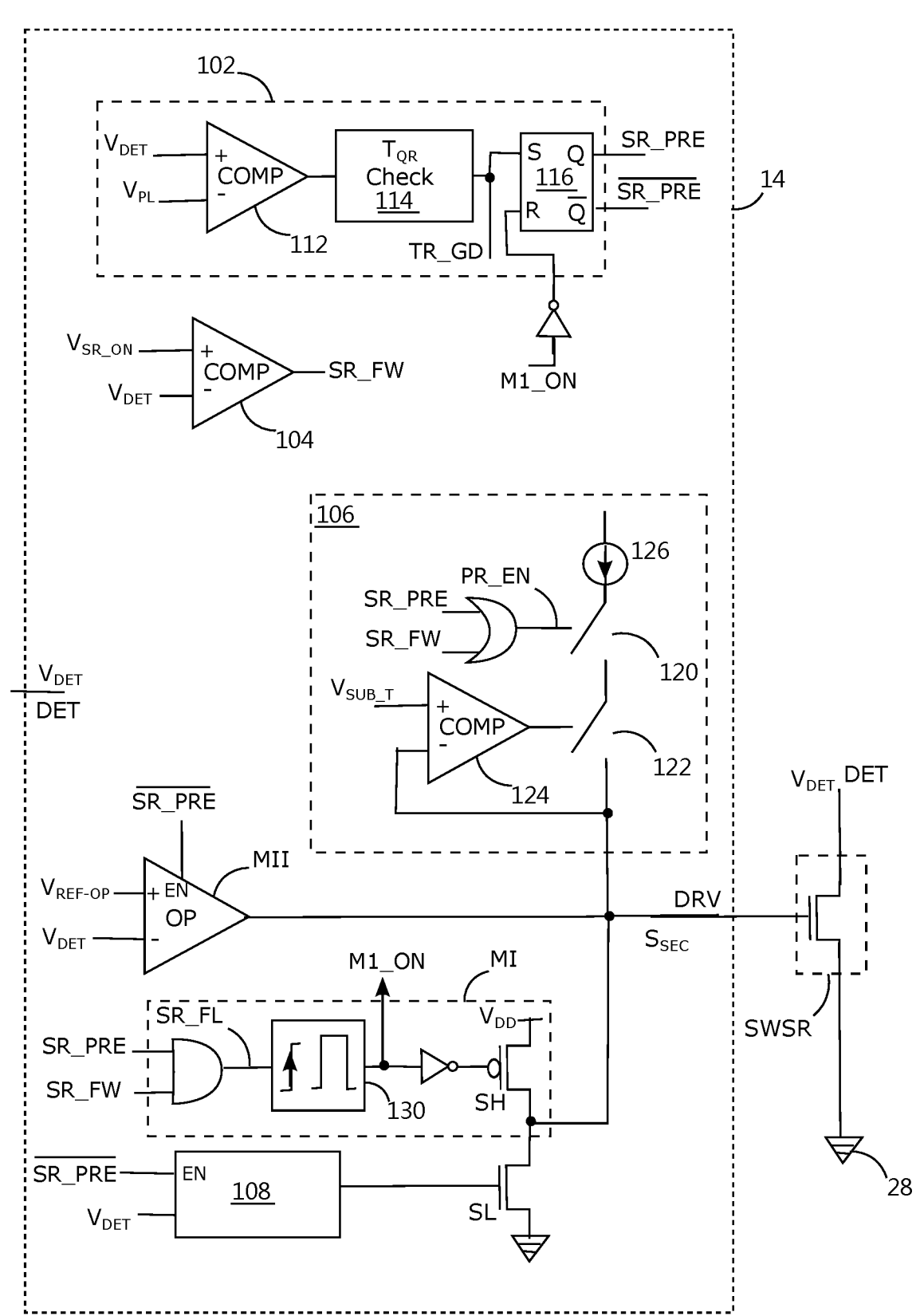
FIG. 2 illustrates the SR controller shown in FIG. 1.

FIG. 2 illustrates SR controller 14 shown in FIG. 1, comprising primary-side ON detector 102, forward-bias voltage detector 104, precharge circuit 106, drivers MI and MII, pull-down controller 108, pull-down switch SL, and some logic controls.

In primary-side ON detector 102, comparator 112 compares detection signal $V_{DET}$ at detection terminal DET with predetermined level $V_{PL}$, which is 15V for example. Here, the duration during which detection signal $V_{DET}$ is higher than predetermined level $V_{PL}$ is referred to as excitation time $T_{PL}$. Debounce circuit 114 checks whether excitation time $T_{PL}$ has exceeded preset time $T_{QR}$. If excitation time $T_{PL}$ is longer than preset time $T_{QR}$, confirmation signal TR_GD transitions from "0" to "1" in logic; otherwise, it remains "0". When confirmation signal TR_GD transitions from logic "0" to "1", it has a rising edge, and satisfaction signal SR_PRE becomes logic "1". In FIG. 2, register 116 is an SR flipflop as an example. The falling edge of signal M1_ON resets register 116 to make satisfaction signal SR_PRE "0" in logic. Generally speaking, satisfaction signal SR_PRE output by register 116 will be "1" in logic when excitation time $T_{PL}$ has lasted preset time $T_{QR}$.

Forward-bias voltage detector 104 compares detection signal $V_{DET}$ with ON-reference level $V_{SR\_ON}$, −0.4V for example. When detection signal $V_{DET}$ is below ON-reference level $V_{SR\_ON}$, forward-bias voltage detector 104 sets forward-bias signal SR_FW to "1" in logic, indicating that there is a sufficiently large forward-bias voltage between the two ends of the channel that synchronous rectifier SWSR provides. Otherwise, detection signal $V_{DET}$ is not below ON-reference level $V_{SR\_ON}$, and forward-bias voltage detector 104 sets forward-bias signal SR_FW to "0" in logic.

Precharge circuit 106, based on satisfaction signal SR_PRE and forward-bias signal SR_FW, is used to precharge control signal $S_{SEC}$ at control terminal DRV to sub-threshold voltage $V_{SUB\_T}$, which is between threshold voltage $V_{SR\_TH}$ and 0V. For example, threshold voltage $V_{SR\_TH}$ is 5V and sub-threshold voltage $V_{SUB\_T}$ is 2.5V. As shown in FIG. 2, current source 126 can charge control terminal DRV through switches 120 and 122 as long as either forward-bias signal SR_FW or satisfaction signal SR_PRE is "1", quickly raising control signal $S_{SEC}$ up to sub-threshold voltage $V_{SUB\_T}$. Comparator 124 turns ON switch 122 allowing current source 126 to charge control terminal DRV until control signal $S_{SEC}$ is equal to or more than sub-threshold voltage $V_{SUB\_T}$. In other words, comparator 124 stops current source 126 from charging control terminal DRV if control signal $S_{SEC}$ exceeds sub-threshold voltage $V_{SUB\_T}$.

Driver MI includes pull-up switch SH and control circuit 130. Pull-up switch SH is a PMOS transistor for example. When pull-up switch SH is turned on, it can quickly pull up control signal $S_{SEC}$ to constant ON voltage VDD, which for example is an operating power supply voltage. Forward-bias signal SR_FW and satisfaction signal SR_PRE, through an AND gate, can trigger control circuit 130 to turn on pull-up switch SH. Control circuit 130 in FIG. 2 is a pulse generator for example. From the analysis of FIG. 2, when both forward-bias signal SR_FW and satisfaction signal SR_PRE are "1" in logic, control circuit 130 provide signal M1_ON having a pulse with a preset pulse width, to turn on pull-up switch SH for a predetermined time.

FIG. 2 shows that driver MII is an operational amplifier, comparing detection signal $V_{DET}$ with default reference level $V_{REF\_OP}$ to adjust control signal $S_{SEC}$. Driver MII is used to approximately regulate detection signal $V_{DET}$ at default reference level $V_{REF\_OP}$. In one embodiment, both default reference level $V_{REF\_OP}$ and ON-reference level $V_{SR\_ON}$ are −0.4V. In another embodiment, default reference level $V_{REF\_OP}$ is −0.5V, and ON-reference level $V_{SR\_ON}$ is −0.4V. When satisfaction signal SR_PRE output by register 116 is "1", driver MII is disabled, and its output becomes high impedance.

Pull-down controller 108 can turn ON pull-down switch SL to quickly pull control signal $S_{SEC}$ down to 0V, effectively turning off synchronous rectifier SWSR and preventing induced current $I_{SEC}$ from becoming negative. For example, pull-down controller 108 compares detection signal $V_{DET}$ with 0V, the ground reference voltage at output ground line 28. When detection signal $V_{DET}$ is higher than 0V, pull-down controller 108 turns ON pull-down switch SL, clamping control signal $S_{SEC}$ to 0V. When satisfaction signal SR_PRE is logic "1", pull-down controller 108 is disabled and keeps pull-down switch SL OFF.

Figure 3:
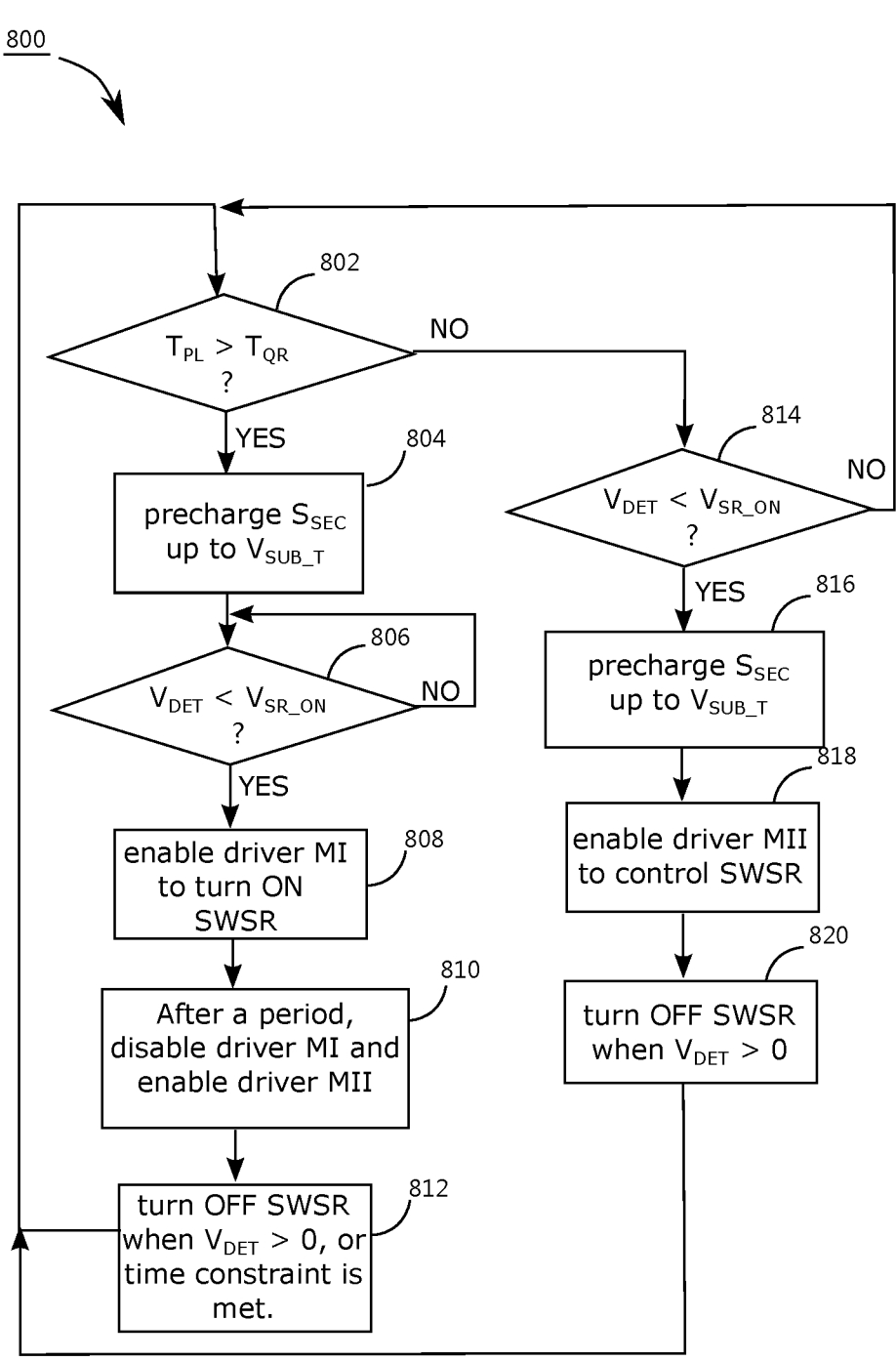
FIG. 3 illustrates a control method used for the SR controller in FIG. 2.
Figure 4:
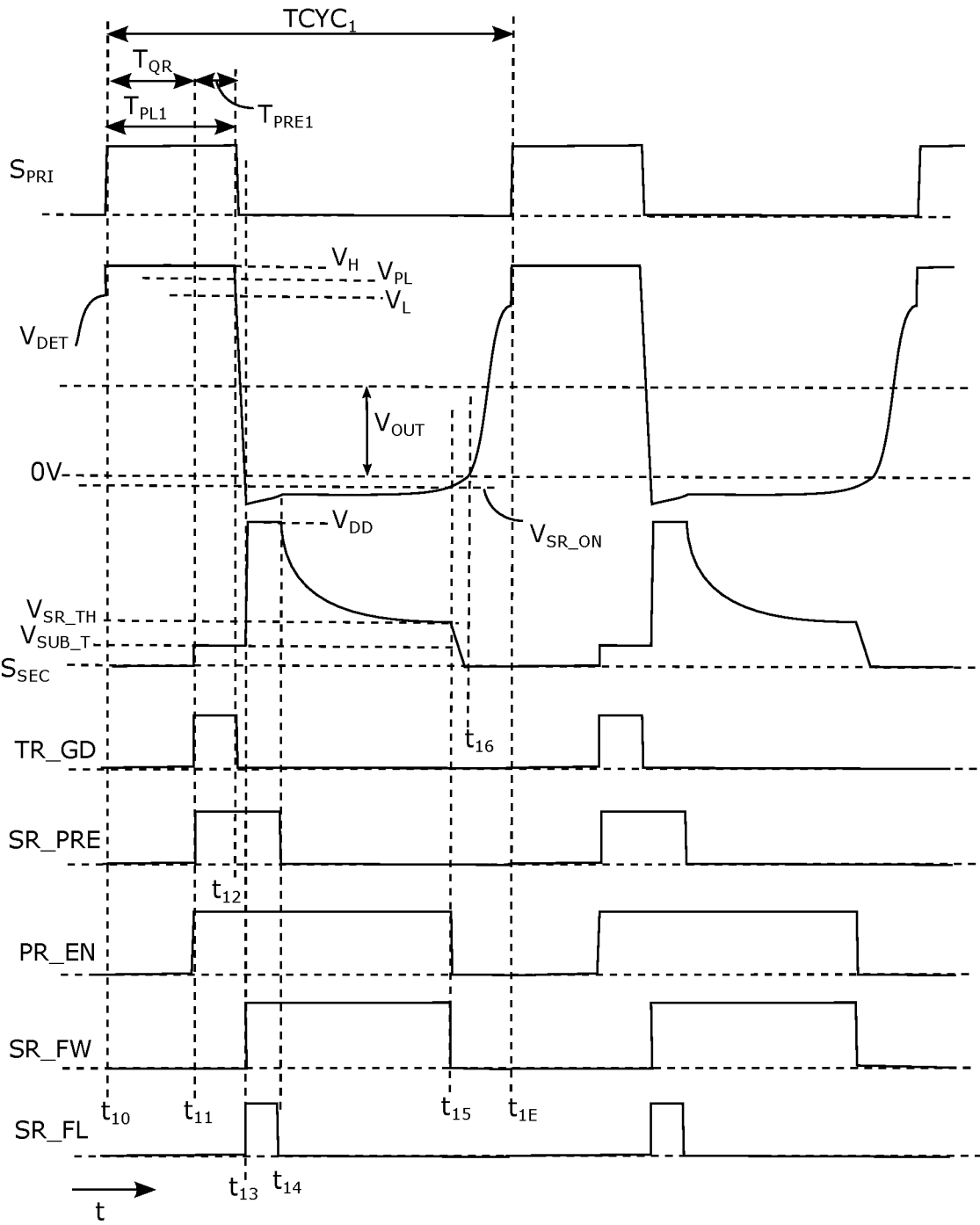
FIG. 4 shows some signal waveforms in FIGS. 1 and 2 from moment $t_{10}$ to moment $t_{1E}$ within switching cycle $TCYC_1$.

FIG. 3 illustrates control method 800 used for SR controller 14 in FIG. 2. FIG. 4 shows some signal waveforms in FIGS. 1 and 2 from moment $t_{10}$ to moment $t_{1E}$ within switching cycle $TCYC_1$. FIG. 4, from top to bottom, has PWM signal $S_{PRI}$ controlling power switch N1, detection signal $V_{DET}$, control signal $S_{SEC}$ for controlling synchronous rectifier SWSR, confirmation signal TR_GD output by debounce circuit 114, satisfaction signal SR_PRE output by register 116, precharge signal PR_EN within precharge circuit 106, forward-bias signal SR_FW output by forward-bias voltage detector 104, and fully-ON signal SR_FL that driver MI provides to control circuit 130.

Step 802 of FIG. 3 checks whether excitation time $T_{PL}$ has lasted preset time $T_{QR}$. Referring to FIG. 4, at moment $t_{10}$, PWM signal $S_{PRI}$ starts to turn on power switch N1. Due to inductive coupling of transformer TF, detection signal $V_{DET}$ rises to high voltage level $V_H$ at time $t_{10}$, exceeding predetermined level $V_{PL}$. At moment $t_{10}$, comparator 112 in FIG. 2, in response to detection signal $V_{DET}$ exceeding predetermined level $V_{PL}$, indicates the beginning of excitation time $T_{PL1}$. At moment $t_{11}$, debounce circuit 114 in FIG. 2 detects that excitation time $T_{PL}$, has lasted preset time $T_{QR}$. Therefore, confirmation signal TR_GD turns from "0" to "1" in logic, causing both satisfaction signal SR_PRE and precharge signal PR_EN to transition to "1" in logic, as illustrated in FIG. 4.

When satisfaction signal SR_PRE is "1", both driver MII and pull-down controller 108 in FIG. 2 are disabled, not to clamp control signal $S_{SEC}$ down to 0V.

When the result of step 802 of FIG. 3 is affirmative, step 804 proceeds to precharge control signal $S_{SEC}$ up to sub-threshold voltage $V_{SUB\_T}$. Precharge time $T_{PRE1}$, the time interval from moment $t_{11}$ to moment $t_{12}$ in FIG. 4, represents the part when excitation time $T_{PL}$, exceeds preset time $T_{QR}$. At moment $t_{11}$ in FIG. 4, precharge signal PR_EN transitions to "1", causing precharge circuit 106 to precharge control signal SSEC at control terminal DRV up to sub-threshold voltage $V_{SUB\_T}$, which is between threshold voltage $V_{SR\_TH}$ and 0V, as shown in FIG. 4. During precharge time $T_{PRE1}$, driver MII is disabled, and control signal $S_{SEC}$ is maintained at sub-threshold voltage $V_{SUB\_T}$.

Step 806 of FIG. 3 follows step 804. Forward-bias voltage detector 104 compares detection signal $V_{DET}$ with ON-reference level $V_{SR\_ON}$. Once it is detected that detection signal $V_{DET}$ is below ON-reference level $V_{SR\_ON}$, step 808 begins to enable driver MI to turn ON synchronous rectifier SWSR. At moment $t_{12}$ in FIG. 4, PWM signal $S_{PRI}$ starts to turn OFF power switch N1, causing detection signal $V_{DET}$ to rapidly drop from high voltage level $V_H$ and ending excitation time $T_{PL1}$. At moment $t_{13}$ in FIG. 4, detection signal $V_{DET}$ is already below ON-reference level $V_{SR\_ON}$, and fully-ON signal SR_FL transitions to "1". Driver MI, through control circuit 130, turns ON pull-up switch SH, quickly pulling up control signal $S_{SEC}$ to constant ON voltage $V_{DD}$.

After driver MI has fully turned ON synchronous rectifier SWSR for a certain period, step 810 disables driver MI and begins to enable driver MII. Control circuit 130, at moment $t_{14}$, turns OFF pull-up switch SH, and at the same time resets register 116, causing both satisfaction signal SR_PRE and fully-ON signal SR_FL to transition to "0". Consequently, driver MI is disabled, pull-up switch SH is turned off, and control signal $S_{SEC}$ is no longer pulled up to constant ON voltage $V_{DD}$. As enabled, driver MII starts to regulate detection signal $V_{DET}$ to default reference level $V_{REF}\_op$. Therefore, control signal $S_{SEC}$ gradually decreases from constant ON voltage $V_{DD}$, as shown in FIG. 4.

In step 812, when detection signal VDET is greater than 0V or a time constraint is met, pull-down controller 108 in FIG. 2 turns ON pull-down switch SL, fixing control signal $S_{SEC}$ at 0V. At time $t_{15}$ in FIG. 4, detection signal $V_{DET}$ begins to rise above ON-reference level $V_{SR\_ON}$, and precharge circuit 106 stops clamping control signal $S_{SEC}$, which continues decreasing as being driven by driver MII. At time $t_{16}$, detection signal $V_{DET}$ starts to exceed 0V, and accordingly pull-down switch SL is turned ON, fixing control signal $S_{SEC}$ at 0V.

From FIG. 4, it can be observed that after excitation time $T_{PL1}$ exceeds preset time $T_{QR}$, SR controller 14 can confirm that power switch N1 on primary side PRM has been ON for a sufficient duration, and that synchronous rectifier SWSR can then be prepared to rectify upcoming high current. Accordingly, control signal $S_{SEC}$ is precharged to sub-threshold voltage $V_{SUB\_T}$. This allows control signal $S_{SEC}$ to rise rapidly to constant ON voltage $V_{DD}$ from sub-threshold voltage $V_{SUB\_T}$ at subsequent moment $t_{13}$. This rapid rise enables synchronous rectifier SWSR to be ON quickly, providing a low-impedance channel, which reduces conduction losses significantly. Additionally, at moment $t_{13}$, synchronous rectifier SWSR is turned ON using driver MI, which quickly raises control signal $S_{SEC}$ to constant ON voltage $V_{DD}$, further reducing the channel impedance of synchronous rectifier SWSR.

Figure 5:
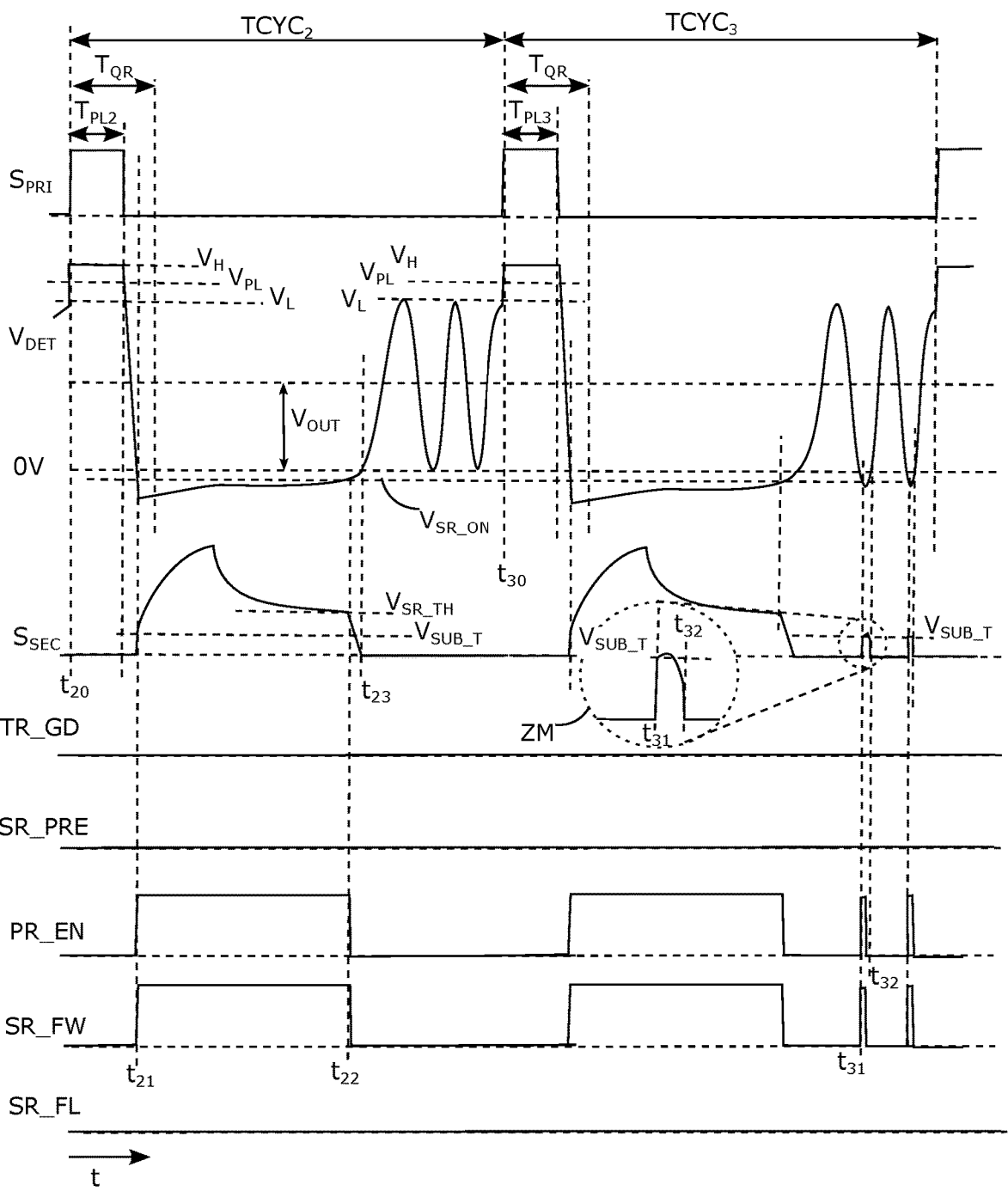
FIG. 5 illustrates switching cycle $T_{CYC2}$ from moment $t_{20}$ to moment $t_{30}$, as well as switching cycle $T_{CYC3}$ from moment $t_{30}$ to moment $t_{3E}$.

FIG. 5 illustrates switching cycle $T_{CYC2}$ from moment $t_{20}$ to moment $t_{30}$, as well as switching cycle $T_{CYC3}$ from moment $t_{30}$ to moment $t_{3E}$, along with some signal waveforms. Portions of FIG. 5 are similar to or the same with FIG. 4 which has been explained previously, so they will not be reiterated.

As shown in FIG. 5, predetermined level $V_{PL}$ is between high voltage level $V_H$ and low voltage level $V_L$. High voltage level $V_H$ is approximately the voltage level reached by detection signal $V_{DET}$ when power switch N1 is turned on. Low voltage level $V_L$ is approximately the voltage level of the highest peak that detection signal VDET oscillates to reach after transformer TF completes discharging at moment $t_{23}$. For example, low voltage level $V_L$ is roughly twice the voltage of DC output power source $V_{OUT}$.

In switching cycle $T_{CYC2}$, excitation time $T_{PL2}$, during which detection signal $V_{DET}$ remains above predetermined level $V_{PL}$, is shorter than preset time $T_{QR}$. Therefore, debounce circuit 114 in FIG. 2 consistently sets confirmation signal TR_GD to "O", causing that both satisfaction signal SR_PRE and fully-ON signal SR_FL are "0" throughout entire switching cycle $T_{CYC2}$. This implies that driver MI is not used to turn on synchronous rectifier SWSR during switching cycle $T_{CYC2}$. In control method 800 of FIG. 3, the result of step 802 is negative for switching cycle $T_{CYC2}$, so step 814 follows to check whether detection signal $V_{DET}$ is below the ON-reference level $V_{SR\_ON}$.

At moment $t_{21}$ in switching cycle TCYC2, detection signal $V_{DET}$ has fallen below ON-reference level $V_{SR\_ON}$, causing precharge circuit 106 to rapidly precharge control signal $S_{SEC}$ to sub-threshold voltage $V_{SUB\_T}$ (step 816). Subsequently, driver MII adjusts control signal $S_{SEC}$ based on detection signal $V_{DET}$, slowly raising or lowering it (step 818), approximately maintaining control signal $S_{SEC}$ above threshold voltage $V_{SR\_TH}$.

At moment $t_{22}$, detection signal $V_{DET}$ is no longer able to be maintained at ON-reference level $V_{SR\_ON}$. Accordingly, control signal $S_{SEC}$ is pulled down below threshold voltage $V_{SR\_TH}$, and both forward-bias signal SR_FW and precharge signal PR_EN transition to "0" in logic.

At moment $t_{23}$, as detection signal $V_{DET}$ begins to rise above 0V, pull-down switch SL is turned ON to fix control signal $S_{SEC}$ at 0V (step 820).

Switching cycle $T_{CYC3}$ is generally similar to switching cycle TCYC$_2$, and the details that are the same or similar can be referred to in the previous explanations. What distinguishes switching cycle $T_{CYC3}$ from switching cycle TCYC$_2$ is that at moment $t_{31}$ within $T_{CYC3}$, for some reasons, detection signal $V_{DET}$ briefly drops below ON-reference level $V_{SR\_ON}$. Therefore, forward-bias signal SR_FW and precharge signal PR_EN momentarily transition to "1" in logic.

Block ZM in FIG. 5 magnifies control signal $S_{SEC}$ near moment $t_{31}$. As precharge signal PR_EN transitions to "1", control signal $S_{SEC}$ is rapidly precharged to sub-threshold voltage $V_{SUB\_T}$ at moment $t_{31}$. At the same time, driver MII also gradually adjusts control signal $S_{SEC}$ based on detection signal $V_{DET}$. As detection signal $V_{DET}$ rises above 0V at moment $t_{32}$, pull-down switch SL is turned ON, fixing control signal $S_{SEC}$ at 0V.

In one embodiment, SR controller 14 can timely sample control signal $S_{SEC}$ to determine threshold voltage $V_{SR\_TH}$ Of synchronous rectifier SWSR. For example, at moment $t_{15}$ or $t_{22}$ in FIGS. 4 and 5 when a falling edge of forward-bias signal SR_FW occurs, SR controller 14 samples control signal $S_{SEC}$ to use as threshold voltage $V_{SR\_TH}$.

SR controller 14 might generate sub-threshold voltage $V_{SUB\_T}$ based on threshold voltage $V_{SR\_TH}$. In one embodiment, sub-threshold voltage $V_{SUB\_T}$ is proportional to threshold voltage $V_{SR\_TH}$, such as being 0.5 times threshold voltage $V_{SR\_TH}$.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for synchronous rectification in use of a power supply having primary and secondary sides isolated from each other, wherein the power supply includes on the secondary side a synchronous rectifier with a control terminal, at which a control signal turns ON the synchronous rectifier to provide a channel approximately short-circuited if the control signal is greater than a threshold voltage, and turns OFF the synchronous rectifier to turn the channel into an open circuit if the control signal is between the threshold voltage and a ground reference voltage, the control method comprising:

receiving a detection signal generated based on one end of the channel;

comparing the detection signal with a predetermined level, wherein the predetermined level is higher than the ground reference voltage, and an excitation time is a period when the detection signal exceeds the predetermined level;

checking if the excitation time lasts a preset time to generate a satisfaction signal; and precharging the control signal to a sub-threshold voltage between the threshold voltage and the ground reference voltage in response to the satisfaction signal.

2. The control method of claim 1, further comprising:

providing an operational amplifier to adjust the control signal in response to the detection signal and regulate the detection signal at a default reference level less than the ground reference voltage.

3. The control method of claim 2, further comprising:

disabling the operational amplifier in response to the satisfaction signal.

4. The control method of claim 3, further comprising:

precharging the control signal to the sub-threshold voltage and disabling the operational amplifier after the excitation time lasts the preset time and before the excitation time ends.

5. The control method of claim 2, comprising:

pulling up the control signal to a constant ON voltage higher than the threshold voltage when the detection signal is less than an ON-reference level after the excitation time ends.

6. The control method of claim 5, further comprising:

providing a pull-up switch for pulling up the control signal;

turning OFF the pull-up switch after turning ON the pull-up switch for a predetermined time; and enabling the operational amplifier to regulate the detection signal at the default reference level after turning OFF the pull-up switch.

7. The control method of claim 1, comprising:

comparing the detection signal and the ground reference voltage; and turning ON a pull-down switch to clamp the control signal to the ground reference voltage if the detection signal exceeds the ground reference voltage.

8

8. The control method of claim 1, comprising:

comparing the detection signal with an ON-reference level to generate a forward-bias signal, wherein the ON-reference level is below the ground reference voltage; and precharging the control signal to the sub-threshold voltage in response to the forward-bias signal.

9. A synchronous rectifier controller in use of a power supply with primary and second sides isolated from each other, wherein on the secondary side the power supply comprises a synchronous rectifier with a control terminal, a control signal at the control terminal turns ON the synchronous rectifier to provide a channel approximately short-circuited if the control signal exceeds a threshold voltage, the control signal substantially turns OFF the synchronous rectifier to turn the channel into an open circuit if the control signal is between the threshold voltage and a ground reference voltage, the synchronous rectifier controller comprising:

a primary-side ON detector, comparing a detection signal at one end of the channel with a predetermined level, wherein the predetermined level is higher than the ground reference voltage, an excitation time is a period when the detection signal exceeds the predetermined level, and the primary-side ON detector provides a satisfaction signal if the excitation time lasts a preset time; and a precharge circuit precharging the control signal to a sub-threshold voltage between the threshold voltage and the ground reference voltage in response to the satisfaction signal.

10. The synchronous rectifier controller of claim 9, wherein the primary-side ON detector comprises:

a comparator, comparing the detection signal with the predetermined level to detect the excitation time; and a debounce circuit connected to the comparator, for generating a confirmation signal if the excitation time lasts the preset time; and a register for recording the conformation signal to generate the satisfaction signal.

11. The synchronous rectifier controller of claim 9, wherein the precharge circuit comprises:

a current source charging the control signal; and a comparator comparing the control signal with the sub-threshold voltage to control the current source.

12. The synchronous rectifier controller of claim 9, comprising:

a driver for pulling up the control signal, comprising:

a pull-up switch for pulling up the control signal to a constant ON voltage higher than the threshold voltage, so as to turn ON the synchronous rectifier; and a control circuit for controlling the pull-up switch in response to the satisfaction signal.

13. The synchronous rectifier controller of claim 12, wherein the control circuit is a pulse generator for turning ON the pull-up switch for a predetermined time.

14. The synchronous rectifier controller of claim 9, further comprising an operational amplifier for driving the control signal to regulate the detection signal at a default reference level less than the ground reference voltage.

15. The synchronous rectifier controller of claim 14, wherein after the excitation time has lasted the preset time and before the excitation time ends, the precharge circuit precharges the control signal to the sub-threshold voltage and the operational amplifier is disabled.

16. The synchronous rectifier controller of claim 9, comprising:
    a pull-down switch connected to the control terminal for fixing the control signal at the ground reference voltage; and
    a pull-down controller to turn ON the pull-down switch when the detection signal exceeds the ground reference voltage.

17. The synchronous rectifier controller of claim 9, comprising:
    a forward-bias voltage detector, for comparing the detection signal with an ON-reference level to generate a forward-bias signal, wherein the ON-reference level is below the ground reference voltage;
    wherein, in response to the forward-bias signal, the precharge circuit precharges the control signal to the sub-threshold voltage if the detection signal is less than the ON-reference level.

18. A control method for controlling a synchronous rectifier with a control terminal, at which a control signal turns ON the synchronous rectifier to provide a channel approximately short-circuited if the control signal is greater than a threshold voltage, and turns OFF the synchronous rectifier to turn the channel into an open circuit if the control signal is between the threshold voltage and a ground reference voltage, wherein one end of the channel provides a detection signal, and the other end of the channel provides the ground reference voltage, the control method comprising:
    comparing the detection signal with a predetermined level to determine an excitation time, wherein the predetermined level is higher than the ground reference voltage, and the excitation time is a period when the detection signal exceeds the predetermined level;
    checking if the excitation time lasts a preset time to generate a satisfaction signal; and
    precharging the control signal to a sub-threshold voltage between the threshold voltage and the ground reference voltage in response to the satisfaction signal.

19. The control method of claim 18, further comprising:
    providing an operational amplifier to adjust the control signal in response to the detection signal and regulate the detection signal at a default reference level less than the ground reference voltage.

20. The control method of claim 19, further comprising:
    disabling the operational amplifier in response to the satisfaction signal and precharging the control signal to the sub-threshold voltage and disabling the operational amplifier after the excitation time lasts the preset time and before the excitation time ends.

* * * * *